US012609889B2

(12) United States Patent
Chen et al.

(10) Patent No.: US 12,609,889 B2
(45) Date of Patent: Apr. 21, 2026

(54) NETWORK DEVICE AND CONFIGURATION METHOD THEREOF FOR STATIC LINK AGGREGATION

(71) Applicant: Moxa Inc., New Taipei City (TW)

(72) Inventors: Lu-Wei Chen, New Taipei City (TW); Chang-Yang Kao, New Taipei City (TW)

(73) Assignee: Moxa Inc., New Taipei City (TW)

( * ) Notice: Subject to any disclaimer, the term of this patent is extended or adjusted under 35 U.S.C. 154(b) by 341 days.

(21) Appl. No.: 18/226,797

(22) Filed: Jul. 27, 2023

(65) Prior Publication Data

US 2024/0396828 A1      Nov. 28, 2024

(30) Foreign Application Priority Data

May 25, 2023      (CN) .......................... 202310600771.3

(51) Int. Cl.
*H04L 45/24*      (2022.01)
*H04L 45/00*      (2022.01)
*H04L 45/28*      (2022.01)

(52) U.S. Cl.
CPC ............ *H04L 45/245* (2013.01); *H04L 45/26* (2013.01); *H04L 45/28* (2013.01); *H04L 45/66* (2013.01)

(58) Field of Classification Search
None
See application file for complete search history.

(56) References Cited

U.S. PATENT DOCUMENTS 8,243,594 B1 *   8/2012   Fotedar ................. H04L 45/245
                                                                370/242
2005/0276215 A1   12/2005   Kitani 2012/0236859 A1 *   9/2012   Subramanian ........ H04L 45/245
                                                                370/392
2014/0025736 A1 *   1/2014   Wang .................... H04L 45/245
                                                                709/204
2019/0319875 A1 *   10/2019   Muthukaruppan ..........................
                                                                H04L 43/0811
2019/0356403 A1 *   11/2019   V.K. ........................ H04L 47/24
2022/0182896 A1 *   6/2022   Talebi Fard ...... H04W 36/0085

FOREIGN PATENT DOCUMENTS

CN        103560898 B      12/2016
CN        111385144 A      7/2020

OTHER PUBLICATIONS

Link aggregation, Sep. 17, 2014, p. 1-8, Wikipedia, XP055394643, https://en.wikipedia.org/w/index.php?title=Link_aggregation&oldid=625975185, Sep. 17, 2014.

* cited by examiner

*Primary Examiner* — Xavier S Wong

(74) *Attorney, Agent, or Firm* — Winston Hsu

(57)      ABSTRACT

A configuration method for static link aggregation is used for a first network device, wherein the first network device has a link aggregation group with a second network device. The configuration method includes receiving at least one packet sent by the second network device via at least one candidate port; determining a priority of each port of the at least one candidate port according to the at least one packet; determining one of the at least one candidate port as a backup port according to the priority of the each port; and updating the link aggregation group according to the backup port in response to a port of the link aggregation group being invalid.

18 Claims, 8 Drawing Sheets

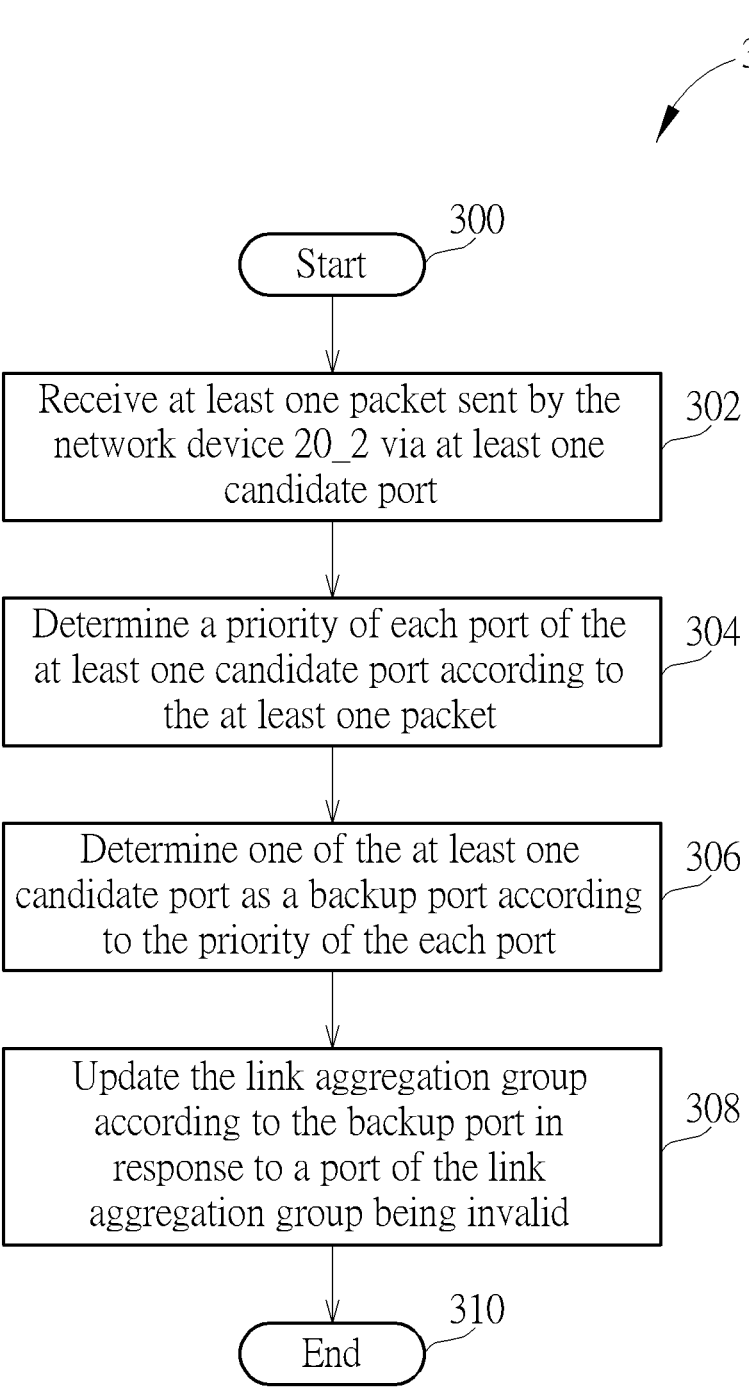

_3_

300

Start

302

Receive at least one packet sent by the network device 20_2 via at least one candidate port

304

Determine a priority of each port of the at least one candidate port according to the at least one packet

306

Determine one of the at least one candidate port as a backup port according to the priority of the each port

308

Update the link aggregation group according to the backup port in response to a port of the link aggregation group being invalid

310

End

FIG. 3

NETWORK DEVICE AND CONFIGURATION METHOD THEREOF FOR STATIC LINK AGGREGATION

BACKGROUND OF THE INVENTION

1. Field of the Invention

The present invention relates to a configuration method and a device for static link aggregation, and more particularly, to a configuration method and a device capable of automatically and quickly maintain a bandwidth for static link aggregation.

2. Description of the Prior Art

Link aggregation (LA) is a standard specified by IEEE 802.3ad, which involves aggregating multiple physical ports or links together to form a logical port or a logical link, so as to increase bandwidth, balance loads, provide network redundancy, etc.

Please refer to FIG. 1, which is a schematic diagram of a network system 1 using link aggregation technology. The network system 1 at least comprises network devices 10 and 12. As shown in FIG. 1, the network device 10 and the network device 12 may communicate with each other via a link aggregation group 16 (or called a trunk) composed of multiple links 14_1-14_N. Through the link aggregation group 16, the data transmission bandwidth between the network device 10 and the network device 12 may be effectively increased.

Link aggregation is generally divided into two modes: static and dynamic. Static link aggregation requires manual configuration of the ports of link aggregation, providing stability and speed, but lacking flexibility. Dynamic link aggregation, also known as Link Aggregation Control Protocol (LACP), uses Link Aggregation Control Protocol Data Units (LACPDU) to negotiate with the connected network devices and configure link aggregation, which offers greater flexibility through dynamical adjustment, but may not be as efficient. If a link of the link aggregation is invalid, dynamic link aggregation is able to maintain bandwidth by negotiating to add a standby port through LACPDU packet exchange. However, dynamic link aggregation takes long negotiation time to complete the backup mechanism, so dynamic link aggregation is less commonly used in certain fields. In contrast, static link aggregation is widely used in industry, but lacks backup mechanisms (such as hot standby) like LACP and cannot cope with the sudden failure of ports or links, which may cause problems such as insufficient transmission bandwidth and packet loss.

SUMMARY OF THE INVENTION

Therefore, the present invention is to provide a method and a device to automatically configure a backup port for static link aggregation, so that when a port or a link fails suddenly, the link aggregation configuration can be quickly adjusted to maintain bandwidth without obstructing data transfer.

An embodiment of the present invention discloses a configuration method for static link aggregation. The configuration method is used for a first network device, wherein the first network device and a second network device have a link aggregation group. The configuration method comprises receiving at least one packet sent by the second network device via at least one candidate port; determining a priority of each port of the at least one candidate port according to the at least one packet; determining one of the at least one candidate port as a backup port according to the priority of the each port; and updating the link aggregation group according to the backup port in response to a port of the link aggregation group being invalid.

An embodiment of the present invention further discloses a first network device. The first network device has a link aggregation group with a second network device and comprises a storage medium, a plurality of ports, a link aggregator and a controller. The storage medium is configured to store information of a backup port. The link aggregator is coupled to the plurality of ports and configured to processing a link aggregation of the link aggregation group. The controller is coupled to the storage medium and the link aggregator and configured to control the first network device to execute a configuration method for static link aggregation. The configuration method comprises receiving at least one packet sent by the second network device via at least one candidate port; determining a priority of each port of the at least one candidate port according to the at least one packet; determining one of the at least one candidate port as the backup port according to the priority of the each port; and updating the link aggregation group according to the backup port in response to a port of the link aggregation group being invalid.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram of a configuration process for static link aggregation according to an embodiment of the present invention.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

3

Figure 1:
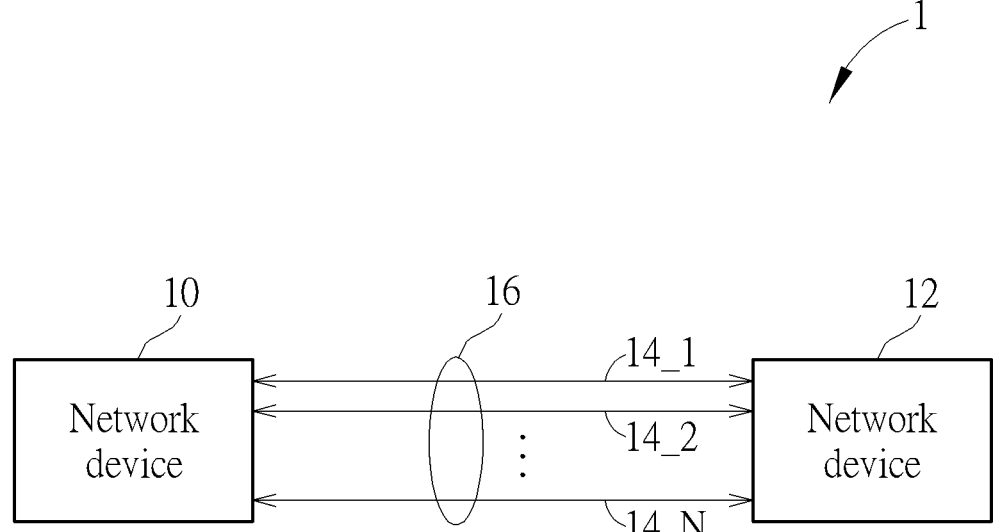
FIG. 1 is a schematic diagram of a network system using link aggregation technology.
Figure 2A:
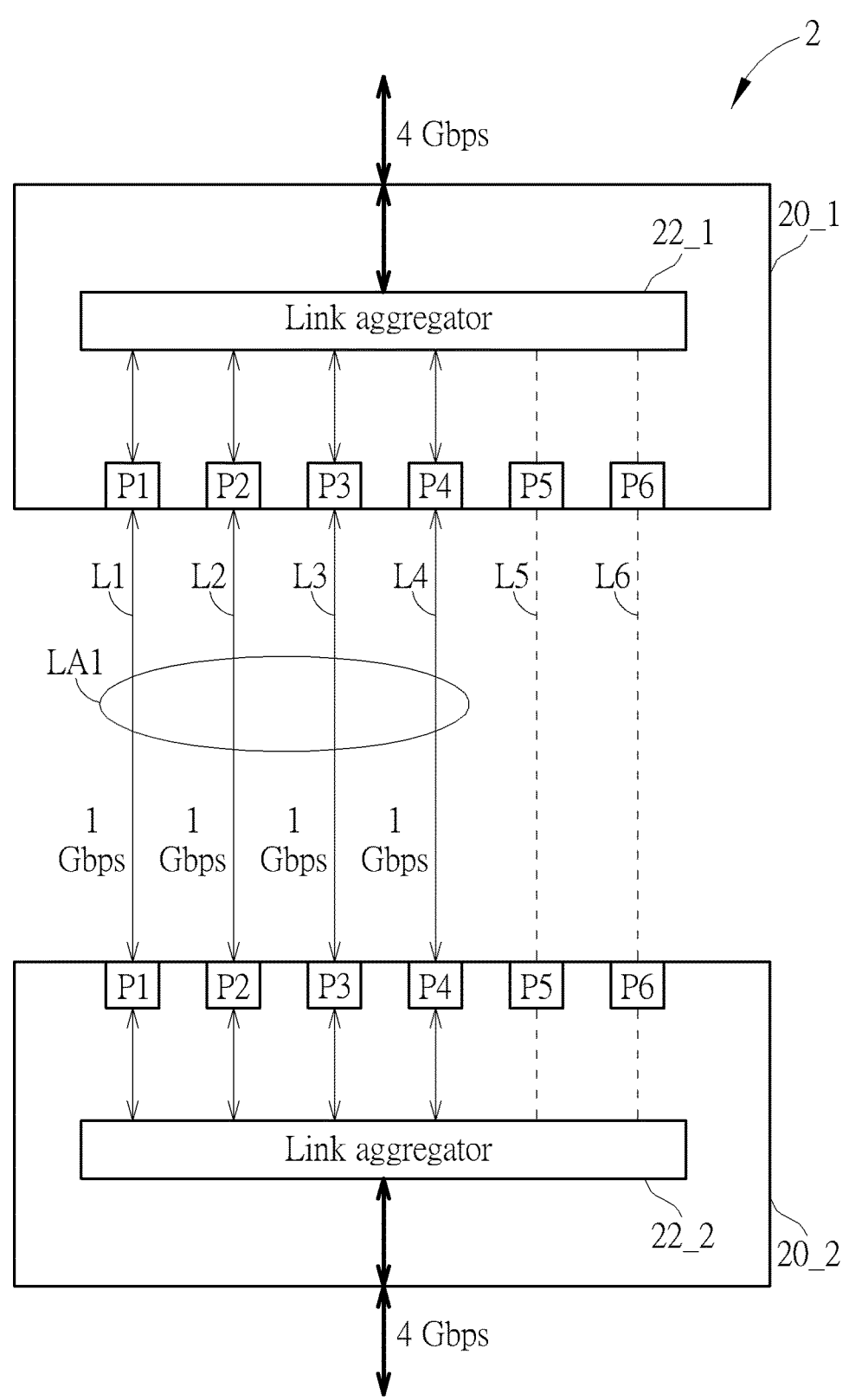
FIG. 2A and FIG. 2B are schematic diagrams of a network system using static link aggregation.
Figure 2B:
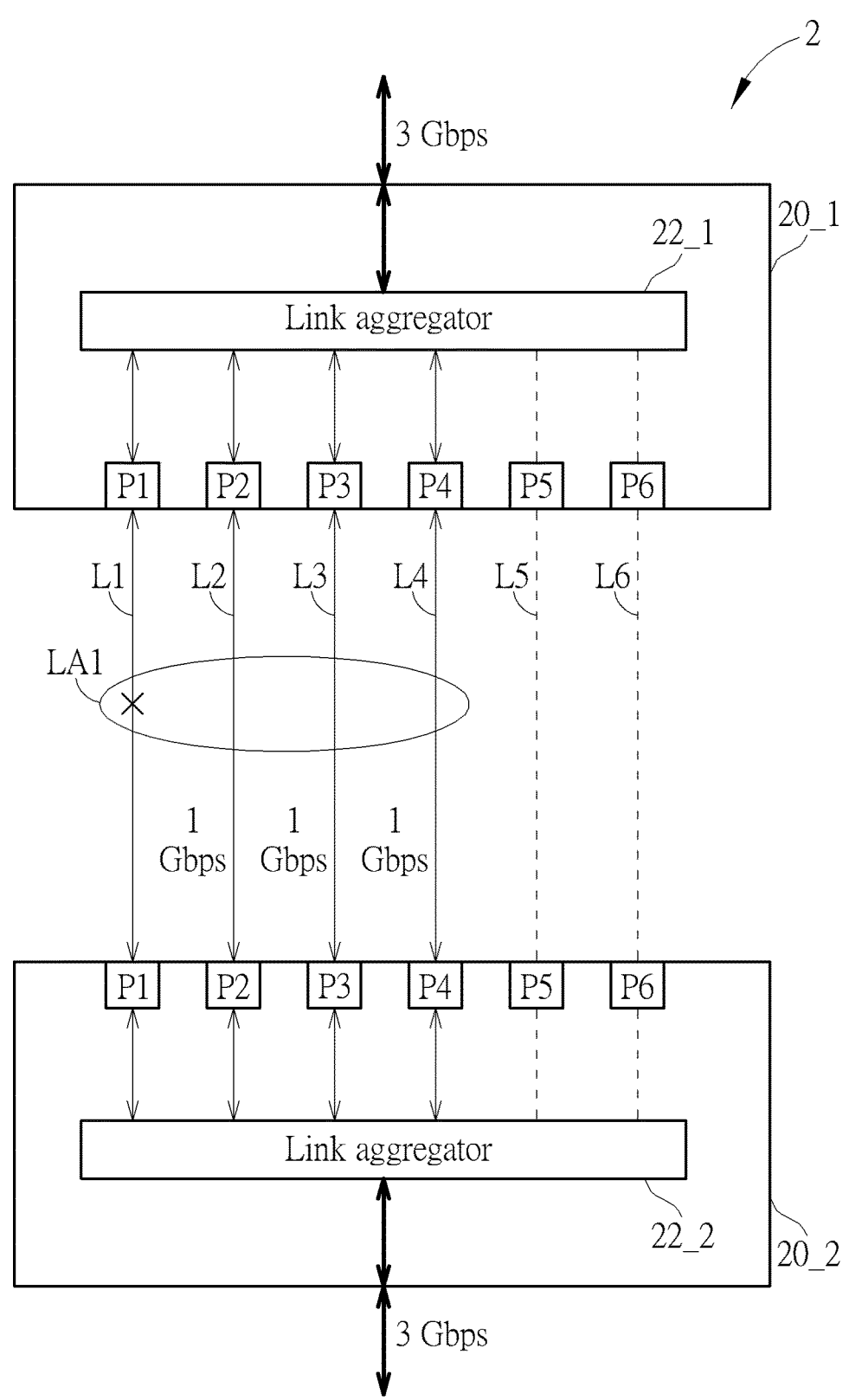

Please refer to FIG. 2A and FIG. 2B. FIG. 2A and FIG. 2B are schematic diagrams of a network system 2 using static link aggregation. The network system 2 has the same architecture as the network system 1, and the network devices 20_1 and 20_2 are the network device 10 or 12 in FIG. 1. For the sake of simplicity, the network device 20_1 is connected to the network device 20_2 through 6 links L1-L6. Specifically, as shown in FIGS. 2A and 2B, the network device 20_1 is connected to the ports P1-P6 of the network device 20_2 through the links L1-L6 via the ports P1-P6 of the network device 20_1. In addition, the network devices 20_1 and 20_2 perform link aggregation through the link aggregators 22_1 and 22_2 respectively. As shown in FIG. 2A, links L1-L4 may be manually configured as a link aggregation group LA1 by a user so as to increase data transmission bandwidth or realize a network backup mechanism. For example, if the maximum transmission bandwidth of each of the links L1-L6 is 1 Gbps, the maximum transmission bandwidth between the network devices 20_1 and 20_2 may achieve 4 Gbps through the link aggregation group LA1 composed of the links L1-L4. In this situation, the links L1-L4 are active and the links L5-L6 are idle.

Furthermore, as shown in FIG. 2B, when one of the links L1-L4 fails, there is still a bandwidth of 3 Gbps to continue data transmission without being completely interrupted. However, in the conventional static link aggregation method, the link aggregation group manually configured by the user does not perform dynamic configuration update. In other words, there is no backup mechanism for link failure. In this situation, even if there are other idle links L5-L6 between the network device 20_1 and the network device 20_2 when one of the link aggregation group LA1 fails, the link aggregation group LA1 may only use the remaining three links that have not failed to transmit data, as shown in FIG. 2B. For example, when the link L1 fails, the network devices 20_1 and 20_2 still use the link aggregation group LA1 for network transmission. In other words, transmission can only be performed through the remaining non-failed links L2-L4 with a total bandwidth of 3 Gbps. Although the transmission may not be completely interrupted, there is still a risk of losing important packets due to insufficient bandwidth.

To address the above problem, the present invention provides a method and a device for configuring static link aggregation. When a link of the link aggregation group fails, the idle link is used to reconfigure the link aggregation group to automatically maintain the bandwidth of the link aggregation. Please refer to FIG. 3, which is a schematic diagram of a configuration process 3 for static link aggregation according to an embodiment of the present invention. The configuration process 3 may be used in the network devices 20_1 and 20_2 in FIG. 2A to improve the shortcomings of the network system 2 as shown in FIG. 2B. Taking the network device 20_1 as an example, in the configuration process 3, the idle links L5 and L6 connected to the network device 20_2 may be regarded as candidate links for a backup link of the link aggregation group LA1, and ports connected to links L5 and L6 may be regarded as candidate ports. The configuration process 3 for static link aggregation is illustrated by taking application to the network device 20_1 as an example, which comprises the following steps:

Step 300: Start.

Step 302: Receive at least one packet sent by the network device 20_2 via at least one candidate port.

Step 304: Determine a priority of each port of the at least one candidate port according to the at least one packet.

Step 306: Determine one of the at least one candidate port as a backup port according to the priority of the each port.

Step 308: Update the link aggregation group according to the backup port in response to a port of the link aggregation group being invalid.

Step 310: End.

According to the configuration process 3, in Step 302, the network device 20_1 sends a packet through each candidate port connected to the network device 20_2 (which has established a link aggregation group therewith), and also receives packets sent by the network device 20_2 via the each candidate port. Then, in Step 304 and Step 306, the network device 20_1 may obtain the information of the network device 20_2 and the ports thereof by analyzing the received packet, and accordingly sort each candidate port connected to the network device 20_2 as a priority for the backup port. Finally, in Step 308, after determining the backup port, when one of the ports of the link aggregation group fails, the network device 20_1 is able to immediately replace the failed port with the backup port so as to update the link aggregation group and quickly restore bandwidth to continue data transmission with the network device 20_2.

In detail, in Step 302, the network device 20_1 and the network device 20_2 exchange packets. The packets at least contain a media access control (MAC) address of the device sending the packet, a MAC address of the port sending the packet (port MAC), and information indicating whether the network device supports the configuration method for static link aggregation of the present invention. The packet exchanged between the network device 20_1 and the network device 20_2 is preferably related to a protocol used for the data link layer (OSI layer 2). In the embodiment of the present invention, a packet of link layer discovery protocol (LLDP) is used as an example, but not limited thereto.

Figure 4:
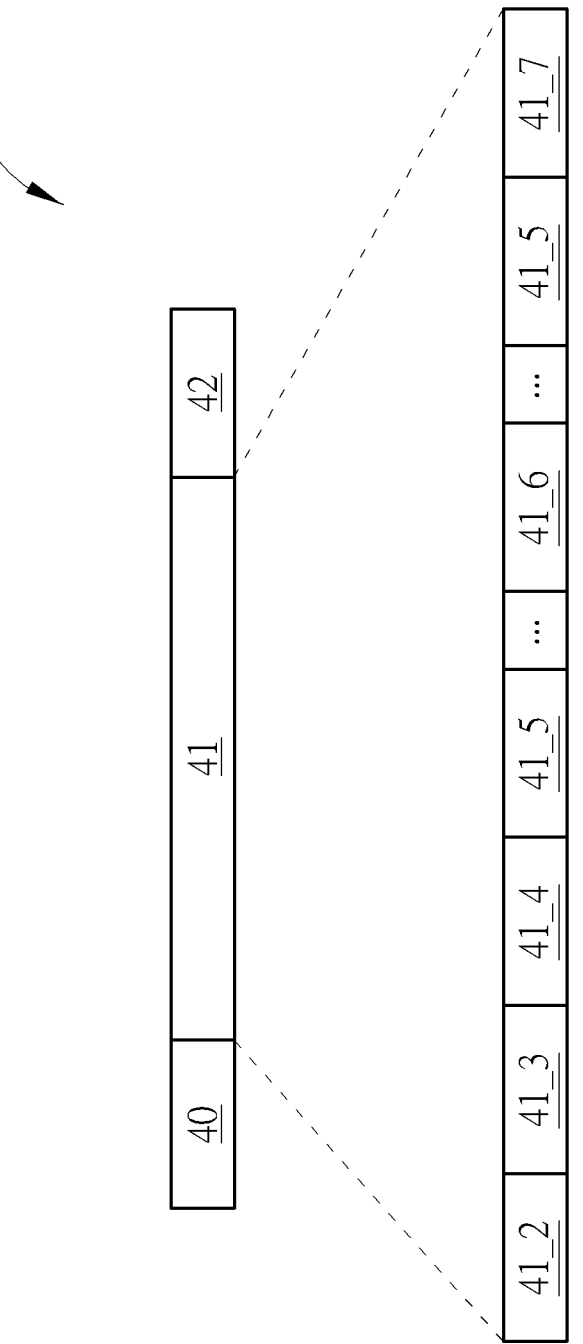
FIG. 4 is a schematic diagram of a LLDP package according to an embodiment of the present invention.

Please continue to refer to FIG. 4, which is a schematic diagram of a packet 4 using LLDP according to an embodiment of the present application. The packet 4 comprises a header 40, a payload 41 and a frame check sequence (FCS) 42. The header 40 comprises a destination MAC address, a source MAC address and an Ethertype. The payload 41 is a Link Layer Discovery Protocol Data Unit (LLDPDU) encapsulating data in TLV format (including type, length and value), and comprises a chassis ID TLV 41_2, a port ID TLV 41_3, a TTL (time to live) TLV 41_4, a plurality of optional TLVs 41_5, an end of LLDPDU TLV 41_7 and a user-defined TLV 41_6. In the embodiment of the present invention, the network device 20_1 may obtain the MAC address of the network device 20_2 through the chassis ID TLV 41_2 in the packet, obtain the port MAC address of the port of the network device 20_2 that sends the packet through the port ID TLV 41_3, and obtain information about whether the network device 20_2 supports the configuration method for static link aggregation of the embodiment of the present invention through the user-defined TLV 41_6, but not limited thereto. Those skilled in the art should be familiar with the format and content related to LLDP packets, which are not described here. It should be noted that exchanging packets through the LLDP protocol is one feasible method for realizing the embodiment of the present invention, where obtaining information related to MAC addresses, port MAC addresses, and whether devices support port this method through TLV format is merely to comply with the specifications of the LLDP protocol. When realizing the embodiment of the present invention using different communication protocols, it is necessary to obtain the required information through packet fields corresponding to the communication protocol or other user-defined information that conforms to the communication protocol format. Moreover, the form in which information is carried in packets is not limited to TLV format.

Figure 5:
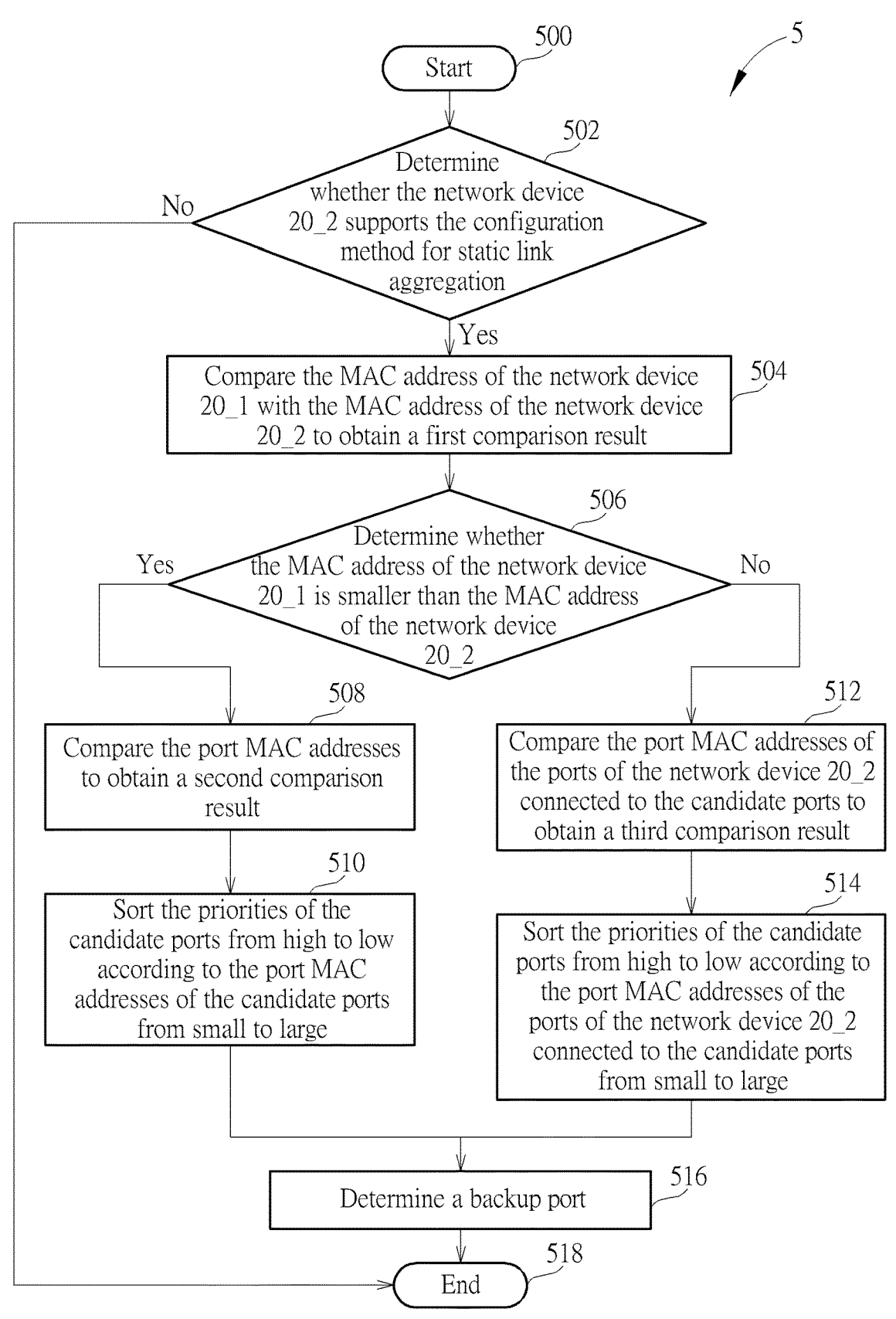
FIG. 5 is a flowchart of a backup port determining process according to an embodiment of the present invention.

According to the configuration process 3, in Step 304 and Step 306, the network device 20_1 may analyze the packets received by each candidate port from the network device 20_2, and may determine a backup port among each candidate port according to a backup port determination method. Please refer to FIG. 5, which is a schematic diagram of a backup port determination process 5 according to an embodiment of the present invention. The backup port determination process 5 comprises the following steps:

Step 500: Start.

Step 502: Determine whether the network device 20_2 supports the configuration method for static link aggregation. If yes, proceed to Step 504; otherwise, proceed to Step 518 and end the backup port determination process.

Step 504: Compare the MAC address of the network device 20_1 with the MAC address of the network device 20_2 to obtain a first comparison result.

Step 506: Determine whether the MAC address of the network device 20_1 is smaller than the MAC address of the network device 20_2. If yes, proceed to Step 508; otherwise, proceed to Step 512.

Step 508: Compare the port MAC addresses to obtain a second comparison result.

Step 510: Sort the priorities of the candidate ports from high to low according to the port MAC addresses of the candidate ports from small to large.

Step 512: Compare the port MAC addresses of the ports of the network device 20_2 connected to the candidate ports to obtain a third comparison result.

Step 514: Sort the priorities of the candidate ports from high to low according to the port MAC addresses of the ports of the network device 20_2 connected to the candidate ports from small to large.

Step 516: Determine a backup port.

Step 518: End.

Specifically, the network device 20_1 may analyze the LLDP packet received through the candidate ports, and determine whether the network device 20_2 supports the configuration method for static link aggregation of the embodiment of the present invention according to the information carried by the user-defined TLV 41_6 (Step 502). It should be noted, even if the network device 20_2 does not support the configuration method, the network device 20_1 can still operate according to the link aggregation group manually configured by the user on the basis of the conventional static link aggregation method. However, in this situation, there is no backup method for sudden link failure. On the contrary, if the network device 20_2 supports the configuration method, the network device 20_1 may further compare the MAC address of the network device 20_1 with the MAC address of the network device 20_2 to obtain a first comparison result (Step 504). The MAC address of the network device 20_1 is known information of the device, and the MAC address of the network device 20_2 may be obtained through the chassis ID TLV 41_2 of the LLDP packet. According to the first comparison result, the device with the smaller MAC address is determined as a master device of the link aggregation, and the device with the larger MAC address is determined as a slave device of the link aggregation (Step 506). When the network device 20_1 is the master device, the backup port is determined according to the port MAC addresses of the candidate ports of the network device 20_1; when the network device 20_1 is the slave device, the backup port is determined according to the port MAC addresses of the candidate ports of the network device 20_2. That is to say, when the network device 20_1 is the master device, the port MAC addresses of the candidate ports of the network device 20_1 are compared to obtain a second comparison result (Step 508), and the port MAC addresses are sorted from small to large on the basis of the second comparison result to determine the priorities of the candidate ports from high to low (Step 510). Wherein, the port MAC addresses of the candidate ports of the network device 20_1 are known information of the network device 20_1. On the other hand, when the network device 20_1 is the slave device, the backup port is determined according to the port MAC addresses of the candidate ports of the network device 20_2. Therefore, the network device 20_1 needs to obtain the port MAC addresses of the ports of the network device 20_2 connected thereto through the LLDP packet received via the candidate ports, i.e., obtain through the port ID TLV 41_3 of the LLDP packet. After obtaining the port MAC addresses of the ports of the network device 20_2 docked with the candidate ports, the network device 20_1 may compare the port MAC addresses to obtain the third comparison result (Step 512). Accordingly, the port MAC addresses of the network device 20_2 are sorted from small to large on the basis of the third comparison result to determine the priorities of the candidate ports of the network device 20_1 connected thereto from high to low (Step 514). Finally, among the candidate ports of the network device 20_1, the candidate port with the highest priority and whose corresponding link is in a link-up state is selected as the backup port. Accordingly, the network device 20_1 may obtain the information of the network device 20_2 according to the LLDP packet, and automatically determine one of the candidate ports as the backup port. When any link in the link aggregation group in operation fails, the failed link will be replaced by the link connected to the backup port so that the link aggregation group is updated to maintain the data transmission bandwidth.

Figure 6:
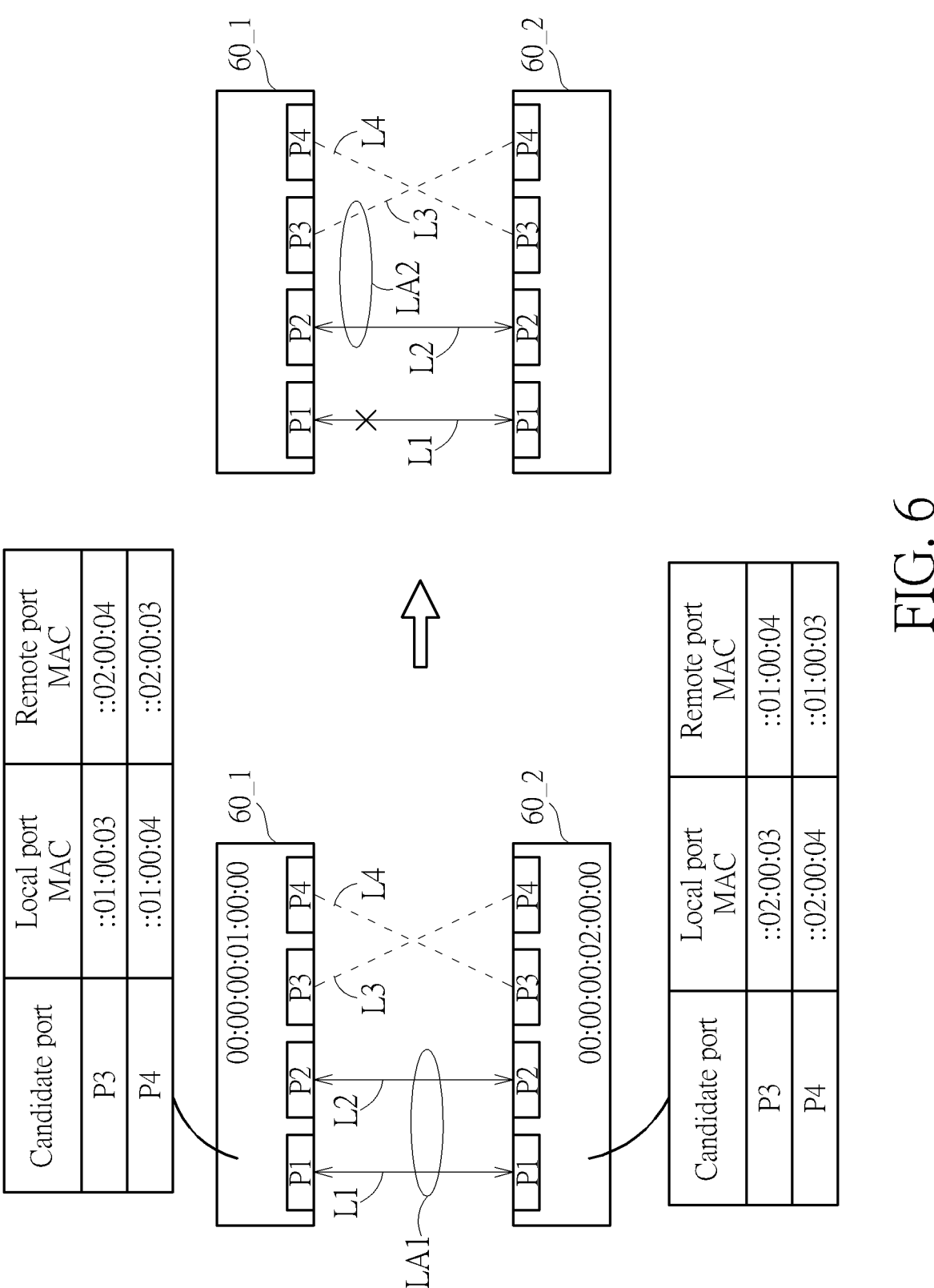
FIG. 6 is a schematic diagram of an example for a backup port determination process according to an embodiment of the present invention.

Please refer to FIG. 6, which is a schematic diagram of an example for the backup port determination process 5 according to the embodiment of the present invention. In FIG. 6, network devices 60_1 and 60_2 may be the network devices 20_1 and 20_2 in FIG. 2A, and in this example, both of the network devices 60_1 and 60_2 support the configuration method for static link aggregation of the embodiment of the present invention. As shown in FIG. 6, the network devices 60_1 and 60_2 have 4 ports P1-P4 respectively, wherein the ports P1-P4 of the network device 60_1 are respectively connected to the ports P1, P2, P4 and P3 of the network device 60_2 through links L1-L4, and the network device 60_1 performs data transmission with the network device 60_2 through the link aggregation group LA1 composed of the links L1 and L2. In this case, the links L3 and L4 are candidate links. The ports P3 and P4 of the network device 60_1 are candidate ports of the network device 60_1, and ports P3 and P4 of the network device 60_2 are candidate ports of the network device 60_2.

According to the backup port determination process 5, in Steps 504-506, the network device 60_1 compares the MAC address of the network device 60_1 (00:00:00:01:00:00) with the MAC address of the network device 60_2 (00:00:00:02:00:00) and determines that the MAC address of the network device 60_1 is smaller than the MAC address of the network device 60_2. Thus, the network device 60_1 is a master device of the link aggregation. Next, in Steps 508-510, the network device 60_1 compares the port MAC address of the candidate port P3 (::01:00:03) with the port MAC address of the candidate port P4 (::01:00:04) to determine the candidate port P3 with the smaller port MAC address to be the backup port and determine the link L3 connected to the port P3 to be the backup link, and stores the information. When any of the links of the link aggregation group LA1 fails, the network device 60_1 will immediately load the information about the backup port P3 from a storage medium and then replace the failed link with the link L3 to update from the link aggregation group LA1 to a link aggregation group LA2.

Moreover, according to the backup port determination process 5, in Steps 504-506, the network device 60_2 compares the MAC address of the network device 60_2 (00:00:00:02:00:00) with the MAC address of the network device 60_1 (00:00:00:01:00:00) and determines that the MAC address of the network device 60_2 is larger than the MAC address of the network device 60_1. Thus, the network device 60_2 is a slave device of the link aggregation. Next, in Steps 508-510, the network device 60_2 compares the port MAC address of the port of the network device 60_1 (i.e., P4) (::01:00:04) connected to the candidate port P3 with the port MAC address of the port of the network device 60_1 (i.e., P3) (::01:00:03) connected to the candidate port P4 to determine the candidate port P4 with the corresponding smaller port MAC address of the port of the network device 60_1 to be the backup port and determine the link L3 connected to the port P4 to be the backup link, and stores the information. When any of the links of the link aggregation group LA1 fails, the network device 60_2 will immediately load the information about the backup port P4 from a storage medium and then replace the failed link with the link L3 to update from the link aggregation group LA1 to the link aggregation group LA2.

Accordingly, in Step 308, once any of the links of the link aggregation group LA1 fails, both of the network devices 60_1 and 60_2 are able to read the stored information about the backup port and thereby quickly update the link aggregation group to automatically maintain bandwidth to continue data transmission.

Taking the situation in FIG. 2A and FIG. 2B as an example, the present invention may achieve that when one of the links L1-L4 in the link aggregation group LA1 fails, the failed link L1 may be replaced with the idle link L5 or L6 to quickly switched to a new link aggregation group composed of the links L2-L5 or a new link aggregation group composed of the links L2-L4 and L6, so that the original bandwidth 4 Gbps between the devices 20_1 and 20_2 may be maintained.

Figure 7:
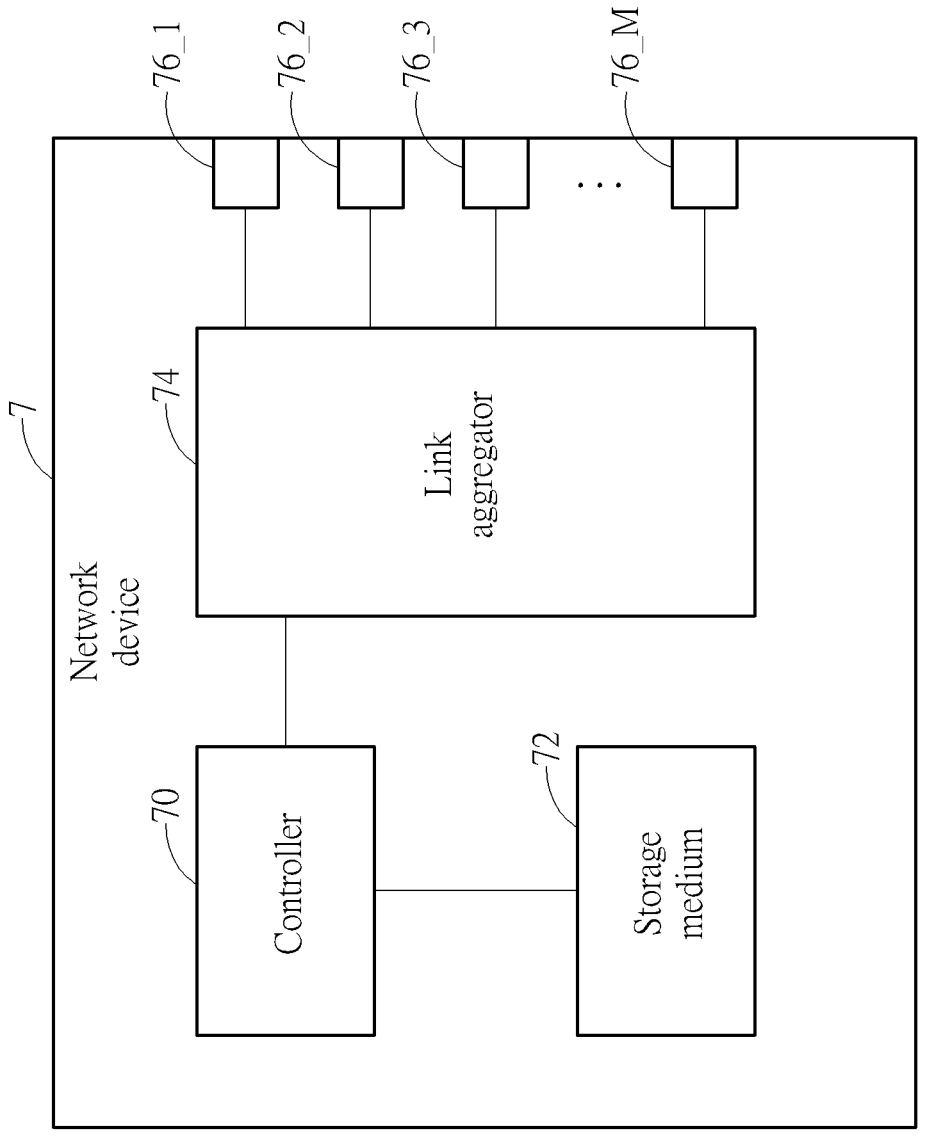
FIG. 7 is a schematic diagram of a network device according to an embodiment of the present invention.

Regarding the operation mode of the network device in the present invention, specifically, please refer to FIG. 7, which is a schematic diagram of a network device 7 according to an embodiment of the present invention. The network device 7 may be used to realize the network devices 20_1 and 20_2 in FIG. 2A and FIG. 2B and the network devices 60_1 and 60_2 in FIG. 6. The network device 7 is a network device with a plurality of ports and communication capabilities, which may be a user terminal device, or a relay device such as a network switch, router, bridge, but is not limited thereto. The network device 7 may at least comprise a controller 70, a storage medium 72, a link aggregator 74 and a plurality of ports 76_1-76_M. The controller 70 is coupled to the storage medium 72 and the link aggregator 74, and the link aggregator 74 is coupled to the plurality of ports 76_1-76_M. Specifically, the storage medium 72 is configured to store required information relative to the plurality of ports 76_1-76_M and links thereof as well as instructions or data required for running the method of the embodiment of the present invention. For example, the storage medium 72 may be a read-only memory (ROM), a flash memory, a random-access memory (RAM), a subscriber identity module (SIM), a hard disk or an optical read-only memory (CD-ROM/DVD-ROM/BD-ROM), but not limited thereto. The link aggregator 74 is coupled to the controller 70 and the plurality of ports 76_1-76_m, and is used for processing the link aggregation of at least one link aggregation group. The controller 70 may be a general-purpose processor, a microprocessor, an application specific integrated circuit (ASIC), etc. or a combination thereof, and is used to control the link aggregator 74 to automatically configure the ports 76_1-76_M for link aggregation according to the configuration process 3 for static link aggregation. The network device 7 is used to represent the necessary components required to implement the embodiments of the present invention, and those skilled in the art may make various modifications and adjustments accordingly, and is not limited to this.

It should be noted that the link aggregation group in the embodiment of the present invention uses 2 or 4 ports (or links) to be aggregated at the same time as an example; however, the number of ports for link aggregation is not limited to this. Any number of ports can form a link aggregation group, and those skilled in the art should make modifications according to the needs. In addition, in the embodiment of the present application, two network devices are taken as an example to illustrate the method of adjusting configuration in static link aggregation to automatically maintain bandwidth. However, the network devices of the present invention are not limited to one-to-one interconnection, and may be applied to many-to-many usage scenarios. That is to say, the network device of the present invention may have different link aggregation groups with multiple network devices at the same time, and determine the backup port and back link of each of the link aggregation groups among the candidate ports corresponding to each network device. When a link of one of the link aggregation groups fails, the transmission bandwidth may be restored without affecting other link aggregation groups.

In addition, the configuration process for static link aggregation of the present invention may be executed after the network device is initialized to pre-determine and store the backup port of the link aggregation, and may be executed again after receiving new LLDP packets again during the operation of the network device to update the backup port for the link aggregation. Accordingly, compared to LACP with the mechanism of dynamically negotiating to obtain a backup port through LACPDU after a link failure, the method of the present invention only needs to load the information of the backup port from the storage medium after the link failure, and is able to switch the links of the link aggregation immediately so as to quickly restore the data transmission bandwidth.

The method used in the present invention is compatible with conventional static link aggregation methods, and is also applicable to other protocols that work with static link aggregation. For example, the method may be used in ring networks running redundancy protocols to achieve bandwidth expansion and path redundancy. In addition, the present invention may also be applied to systems that require stability and large bandwidth, such as video surveillance systems, to effectively avoid security concerns caused by link failures that cause screen omissions.

In summary, the present invention determines the backup port of link aggregation through packet exchange between network devices. When link failure occurs in link aggregation, quick switch is performed to automatically maintain data transmission bandwidth. Therefore, the problem of lack of a backup mechanism for static link aggregation is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A configuration method for static link aggregation, used for a first network device, wherein the first network device and a second network device have a link aggregation group, the configuration method comprising:

receiving at least one packet sent by the second network device via at least one candidate port;

determining a priority of each port of the at least one candidate port according to the at least one packet;

determining one of the at least one candidate port as a backup port according to the priority of the each port; and updating the link aggregation group according to the backup port in response to a port of the link aggregation group being invalid.

2. The configuration method of claim 1, wherein the at least one packet is a packet of link layer discovery protocol (LLDP).

3. The configuration method of claim 1, wherein the at least one packet comprises information for indicating whether the second network device supports the configuration method for static link aggregation.

4. The configuration method of claim 1, wherein the step of determining the priority of the each port of the at least one candidate port according to the at least one packet comprises:

comparing a first MAC address of the first network device with a second MAC address of the second network device to obtain a first comparison result;

comparing a first port MAC address of each port of the at least one candidate port according to the first comparison result, so as to obtain a second comparison result, or comparing a second port MAC address of the second network device corresponding to the each port of the at least one candidate port according to the first comparison result, so as to obtain a third comparison result; and determining the priority of the each port of the at least one candidate port according to the first comparison result and the second comparison result or the third comparison result.

5. The configuration method of claim 4, wherein the step of determining the priority of the each port of the at least one candidate port according to the first comparison result and the second comparison result or the third comparison result comprises:

determining the priority of the each port of the at least one candidate port according to the second comparison result in response to the first comparison result indicating that the first MAC address is smaller than the second MAC address; and determining the priority of the each port of the at least one candidate port according to the third comparison result in response to the first comparison result indicating that the first MAC address is larger than the second MAC address.

6. The configuration method of claim 5, wherein the step of determining the priority of the each port of the at least one candidate port according to the second comparison result in response to the first comparison result indicating that the first MAC address is smaller than the second MAC address comprises:

sorting the priority from high to low according to the first port MAC address of the each port of the at least one candidate port from small to large.

7. The configuration method of claim 5, wherein the step of determining the priority of the each port of the at least one candidate port according to the third comparison result in response to the first comparison result indicating that the first MAC address is larger than the second MAC address comprises:

sorting the priority from high to low according to the second port MAC address of the second network device corresponding to the each port of the at least one candidate port from small to large.

8. The configuration method of claim 1, wherein the step of determining the one of the at least one candidate port as the backup port according to the priority of the each port comprises selecting a port of the at least one candidate port with corresponding link that is not invalid and with a highest priority to be the backup port.

9. The configuration method of claim 1, wherein the step of updating the link aggregation group according to the backup port in response to a port of the link aggregation group being invalid is replacing the invalid port with the backup port so as to update the link aggregation group.

10. A first network device, having a link aggregation group with a second network device, comprising:

a storage medium, configured to store information of a backup port;

a plurality of ports;

a link aggregator, coupled to the plurality of ports, configured to processing a link aggregation of the link aggregation group; and a controller, coupled to the storage medium and the link aggregator, configured to control the first network device to execute a configuration method for static link aggregation, wherein the configuration method comprises:

receiving at least one packet sent by the second network device via at least one candidate port;

determining a priority of each port of the at least one candidate port according to the at least one packet;

determining one of the at least one candidate port as the backup port according to the priority of the each port; and updating the link aggregation group according to the backup port in response to a port of the link aggregation group being invalid.

11. The first network device of claim 10, wherein the at least one packet is a packet of link layer discovery protocol (LLDP).

12. The first network device of claim 10, wherein the at least one packet comprises information for indicating whether the second network device supports the configuration method for static link aggregation.

13. The first network device of claim 10, wherein the step of determining the priority of the each port of the at least one candidate port according to the at least one packet comprises:

comparing a first MAC address of the first network device with a second MAC address of the second network device to obtain a first comparison result;

comparing a first port MAC address of each port of the at least one candidate port according to the first comparison result, so as to obtain a second comparison result, or comparing a second port MAC address of the second network device corresponding to the each port of the at least one candidate port according to the first comparison result, so as to obtain a third comparison result; and determining the priority of the each port of the at least one candidate port according to the first comparison result and the second comparison result or the third comparison result.

14. The first network device of claim 13, wherein the step of determining the priority of the each port of the at least one candidate port according to the first comparison result and the second comparison result or the third comparison result comprises:

determining the priority of the each port of the at least one candidate port according to the second comparison result in response to the first comparison result indicating that the first MAC address is smaller than the second MAC address; and determining the priority of the each port of the at least one candidate port according to the third comparison result in response to the first comparison result indicating that the first MAC address is larger than the second MAC address.

15. The first network device of claim 14, wherein the step of determining the priority of the each port of the at least one candidate port according to the second comparison result in response to the first comparison result indicating that the first MAC address is smaller than the second MAC address comprises:

sorting the priority from high to low according to the first port MAC address of the each port of the at least one candidate port from small to large.

16. The first network device of claim 14, wherein the step of determining the priority of the each port of the at least one candidate port according to the third comparison result in response to the first comparison result indicating that the first MAC address is larger than the second MAC address comprises:

sorting the priority from high to low according to the second port MAC address of the second network device corresponding to the each port of the at least one candidate port from small to large.

17. The first network device of claim 10, wherein the step of determining the one of the at least one candidate port as the backup port according to the priority of the each port comprises selecting a port of the at least one candidate port with corresponding link that is not invalid and with a highest priority to be the backup port.

18. The first network device of claim 10, wherein the step of updating the link aggregation group according to the backup port in response to a port of the link aggregation group being invalid is replacing the invalid port with the backup port so as to update the link aggregation group.

* * * * *